United States Patent [19]

Rechmeier

[11] 4,185,080

[45] Jan. 22, 1980

[54] METHOD OF REDUCING THE SULFUR OXIDE CONTENT OF COMBUSTION GASES RESULTING FROM COMBUSTION OF SULFUR-CONTAINING FOSSIL FUELS

[75] Inventor: Helmuth Rechmeier, Balingen, Fed. Rep. of Germany

[73] Assignees: Rudolf Rohrbach; Gerhard Rohrbach, both of Dotternhausen, Fed. Rep. of Germany

[21] Appl. No.: 930,383

[22] Filed: Aug. 2, 1978

[30] Foreign Application Priority Data

Aug. 5, 1977 [DE] Fed. Rep. of Germany ....... 2735436

[51] Int. Cl.$^2$ .............................................. C01B 17/00
[52] U.S. Cl. .................................... 423/242; 110/343; 110/345
[58] Field of Search .................. 423/242, 242 A, 244, 423/244 A, 164, 640; 110/343, 345

[56] References Cited

U.S. PATENT DOCUMENTS

| 2,718,453 | 9/1955 | Beckman | 423/244 |
| 3,851,042 | 11/1974 | Minnick | 423/244 |
| 3,957,953 | 5/1976 | Squires | 423/244 |

*Primary Examiner*—O. R. Vertiz
*Assistant Examiner*—Gregory A. Heller
*Attorney, Agent, or Firm*—Scully, Scott, Murphy & Presser

[57] ABSTRACT

Sulfur-containing fossil fuels are combusted in the presence of calcium carbonate or calcium magnesium carbonate, whereby the sulfur oxides formed by combustion react with the calcium oxide or calcium magnesium formed from the carbonate during the combustion, thereby to form calcium sulfate or calcium magnesium sulfate. The sulfur oxide content of the combustion gas is thereby reduced. The calcium oxide or calcium magnesium oxide is removed from the combustion, and is slaked with water to form the corresponding hydroxide. This hydroxide is recycled to the combustion zone or to the combustion gases emanating from the combustion zone, whereby the quantities of the carbonate used in the combustion can be reduced.

20 Claims, 2 Drawing Figures

METHOD OF REDUCING THE SULFUR OXIDE CONTENT OF COMBUSTION GASES RESULTING FROM COMBUSTION OF SULFUR-CONTAINING FOSSIL FUELS

FIELD OF THE INVENTION

The invention relates to a method of reducing the sulfur oxide content of combustion gases resulting from combustion of sulfur-containing fossil fuels by means of calcium carbonate (e.g. limestone) or calcium magnesium carbonate (e.g. dolomite) conveyed to the combustion zone during the combustion process, the sulfur oxides thereby resulting, particularly sulfur trioxide which forms by oxidation of sulfur dioxide, combining during the combustion process with the calcium oxide or calcium magnesium oxide resulting from de-acidification of the carbonate during the combustion process, whereby the sulfur oxide content of the combustion gases is reduced.

Combustion of fossil fuels such as oil, hard coal, shale, are used, for example, in industrial furnaces, for instance for current generation.

DESCRIPTION OF THE PRIOR ART

A method of the type specified above is known from the publication "Fluidised Bed Combustion Process Evaluation" Phase II, Pressurized Fluidized Bed Coal Combustion Development, Westinghouse Research Laboratories, Prepared For National Research Center, September 1975, pages 52 to 59. According to this method, flue gases can be desulfurized at temperatures of about 800° C. by the addition of limestone or dolomite, the freshly de-acidified (and at this point highly reactive) limestone or dolomite reacting to form calcium sulfate (gypsum) or calcium magnesium sulfate. The method is applicable to combustion of fuel in a flame as well as to combustion of fuel in a fluidized bed.

In this known method, the degree of utilization of the added limestone or dolomite is very low. Conversion of above 30 to 35% are barely obtained. The reason for this is that the reactions of the sulfur oxides with the limestone or dolomite are surface reactions which virtually come to a halt when the surface of the limestone or dolomite particles are covered with the reaction product, i.e. the sulfate.

The degrees of utilization when ground limestone is blasted into a free burning flame are not much higher than when fuels in lump form, for instance, are burned in a fluidized bed of granular limestone. In any case, conversions or more than about 35% of the limestone used are not obtained.

In practice, therefore, for effective desulfurization, the quantities of limestone or dolomite used must be about 4 to 10 times the stoichiometric quantity. Since heating and de-acidifying of the limestone or dolomite requires a heat consumption of about 600 kcal/kg of limestone or dolomite, the economy of the process, as well as being encumbered with the costs of the excess limestone or dolomite, is also encumbered with the loss of heat from the de-acidification of too great an amount of limestone or dolomite. Furthermore, considerable expenses have to be borne for the harmless deposition of the non-reacted quantities of limestone or dolomite.

OBJECT OF THE INVENTION

The object of the invention is to devise a method of the type specified above in which it is possible to reduce the considerable amounts of calcium carbonate (e.g. limestone) or calcium magnesium carbonate (e.g. dolomite) hitherto required for desulfurization, so as to improve the rationality during the combustion of fossil fuels. The invention is based on the fact that the reaction of the sulfur oxides with calcium carbonate or calcium magnesium carbonate is a surface reaction and that the utilization of the oxide is improved with an increasing specific surface area.

SUMMARY OF THE INVENTION

In order to achieve the object, it is suggested according to the invention that the calcium oxide or calcium magnesium oxide be removed and slaked with water, whereupon the calcium hydroxide or calcium magnesium hydroxide thereby produced is recycled to the combustion zone or to the gases emanating from the combustion zone. The recycling of the hydroxide which is obtained by slaking and which is of fine granulation and therefore has a large specific surface area, is undertaken together with the fossil fuel or separately therefrom or at the same time along with the fossil fuel. This re-supplying may be effected by, for example, blasting it into the combustion zone.

DESCRIPTION OF THE PREFERRED EMBODIMENTS

When putting the method into practice, it has surprisingly emerged that the considerable quantities of the carbonate, e.g. limestone or dolomite, hitherto required can be reduced to essentially stoichiometric quantities, while ensuring adequate desulfurization. This economy achieved by the invention can be improved still further if the conversion speed of the sulfur oxides with the limestone or dolomite is raised. This arises from the known fact that sulfur dioxide, for instance, reacts relatively slowly with calcium carbonate or calcium oxide, whilst sulfur trioxide for example, has a high reaction rate.

The retardation of the reactions between sulfur oxides and calcium oxide or calcium magnesium oxide is thus also contingent on the fact that the reaction of sulphur dioxide with oxygen to form sulfur trioxide in the firing or gas chamber takes place very slowly. It is suggested, therefore, that to establish the equilibrium $SO_2 + \frac{1}{2} O_2 \rightleftarrows SO_3$ more rapidly, a catalyst be supplied to the combustion zone together with the fossil fuel. The catalyst can be, for example, an oxide of a metal having more than one valency state such as vanadium pentoxide. The catalyst can be added together with the fuel both in the pure form and with carrier material which contains such catalysts in significant amounts. Particularly advantageously, ground oil shale or oil shale combustion waste can be used since oil shale or oil shale combustion waste contain quantities of vanadium pentoxide which can amount to a few hundred grams per tonne.

The addition of the catalyst with a carrier material, e.g. oil shale or oil shale combustion waste, has the advantage that, with this carrier material, an extremely fine distribution of the catalyst is obtained.

In an embodiment of the method of the invention, combustion of the fossil fuel takes place in a fluidized bed, namely a fluidized bed formed by particles of the carbonate used or a fluidized bed of inert eddy bodies.

Expediently, during the combustion process, the ashes, together with the resulting calcium oxide or calcium magnesium oxide, are removed from the fluidized bed. The very fine grained ashes usually obtained in the fluidized bed method are separated from the oxide, e.g. by sifting. Then the partially reacted calcium oxide or calcium magnesium oxide which has been separated and which is now de-acidified, is dry slaked in a slaking apparatus, so that an extremely fine-grained calcium hydroxide or calcium magnesium hydroxide powder is produced. Before this, the calcium oxide or calcium magnesium oxide which has been separated from the ashes is separated from the resulting adhering calcium sulfate (gypsum) or calcium magnesium sulfate in a drum or some other suitable apparatus in which there is enough movement.

The fine grained calcium hydroxide or calcium magnesium hydroxide produced by slaking is then blasted by a suitable device either into the fluidized bed or into the gas chamber where an extremely intensive reaction takes place with the sulfur oxides contained in the combustion gases.

The calcium hydroxide or calcium magnesium hydroxide, which has fully reacted, is obtained in part in such a fine granular form that it can be separated in electric filters. A coarser component left behind can be separated by suitable cyclone dust extractors or other devices preceding the electric filters.

In another embodiment of the method of the invention, combustion of the fossil fuel is conducted in a free-burning flame, e.g. in coal dust furnaces or oil furnaces, and the calcium carbonate or calcium magnesium carbonate used to react with the sulfur oxides is first finely ground and then supplied to the combustion zone together with or along with the fossil fuel. By way of example, finely ground limestone or dolomite can be added to the coal dust furnace or be blasted into the furnace together with the oil. As a result of the high flame temperature, de-acidification of the limestone or dolomite takes place in a short period, while reaction of the sulfur oxides therewith takes place until the surface is blocked with sulfate.

After the particles have been subsequently separated by cyclone separators or by electric filters from the flue gases, and after they have been slaked at suitable temperatures to form an extremely fine powder, they are again blasted into the flame chamber and, because of their extremely fine granulation, they react very quickly with the sulfur oxides contained in the flame gases.

Even with free-burning flames, in order to prevent any over-burning of the hydroxide in the flame zone, the hydroxide can be blasted into a zone the temperature of which is below the de-acidification temperature of the carbonate, the very high reactivity of the hydroxide and its fine granularity being retained.

The problem arises, when extracting the dust from the hot waste gases from the boiler, of separating in the same filter both flue ashes and also the oxide and the sulfate produced by the reaction. This may take place in an electric filter, expediently by making use of the differences of the dust resistances of the various substances. In the electric filter, substances with a high dust resistance require a stronger electrostatic field for separation than substances with a low dust resistance. This effect is made use of in the separation of the various substances by using an electric filter which has various sections through which the gases flow successively. In the sections, electrostatic fields of varying strength are maintained such that the lowest field prevails in the first section and the highest field in the last section. When the gases pass through the electric filter, the substances with the lowest dust resistance are then separated in the first section and the substances with the highest dust resistance are separated in the last section. With a mode of operation such as this, extremely good degrees of desulfurization can be achieved.

In the same way as in the reaction in the fluidized bed, the reaction time for obtaining the equilibrium $SO_2 + \frac{1}{2}O_2 \rightleftharpoons SO_3$ with free-burning flame can also be determinative for the reaction rate of the sulfur oxides with the carbonate. In such a case, as in the method with the fluidized bed, catalysts are blasted in with the carbonate powder or with the finely ground coal or with the oil mists in pure form or with other substances containing such catalysts, with the result that establishment of the equilibrium $SO_2 + \frac{1}{2}O_2 \rightleftharpoons SO_3$ can take place with sufficient speed.

The fine calcium oxide or calcium magnesium oxide can be separated after the combustion zone by a cyclone or by electric filters, or can be separated from the ash formed during combustion by sifting.

DESCRIPTION OF THE DRAWINGS

In the drawings, examples of apparatus for implementing the method according to the invention are represented. In the drawings.

Figure 1:
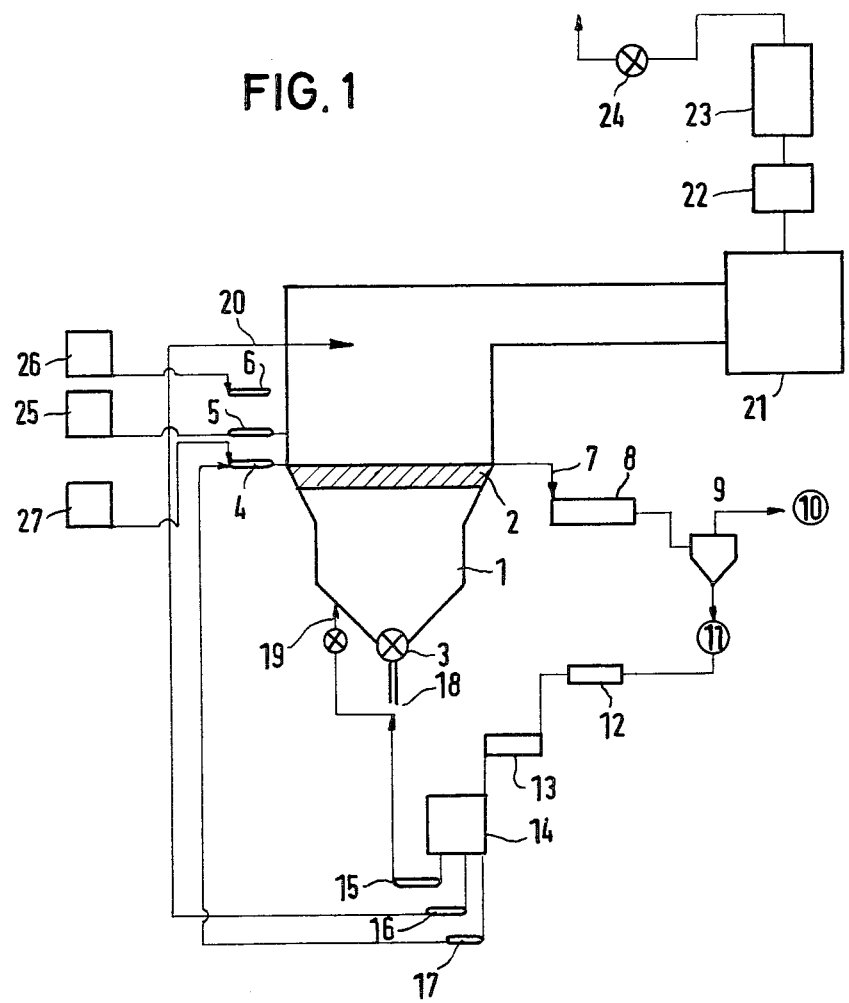
FIG. 1 is a diagrammatic representation of an apparatus for fluidized bed firing.

The reference numerals used in the Figures have the following significance:

1. is a fluidized bed furnace;
2. is a fluidized bed contained in the furnace;
3. is a blowing device for injecting hydroxide into the furnace;
4. is a device for the feeding of fuel to the furnace;
5. is a device for the feeding of limestone or dolomite to the furnace;
6. is a device for the feeding of catalyst to the furnace;
7. is a discharge line for discharge of calcium oxide or calcium magnesium oxide and ashes from the furnace;
8. is a cooling apparatus;
9. is a sifter;
10. is the ashes separated in sifter 9;
11. is the calcium oxide or calcium magnesium oxide separated in sifter 9;
12. is a drum for separating calcium sulfate;
13. is a slaking apparatus for slaking the calcium oxide or calcium magnesium oxide;
14. is a device for receiving calcium hydroxide (lime hydrate or slaked lime) or calcium magnesium hydroxide formed in apparatus 13;
15, 16, and 17. are metering devices for recycling hydroxide from device 14;
18. is an inlet for feeding hydroxide supplied from device 14 via metering device 15 to the blasting device 3;
19. is a further inlet for feeding hydroxide supplied from device 14 via metering device 15 to the fluidized bed;
20. is an inlet for feeding hydroxide supplied from device 14 via metering device 16 to the gas chamber;
21. is a boiler;
22. is a mechanical dust extracting apparatus;
23. is an electric filter;
24. is a blower;
25. is a store device for limestone or dolomite;
26. is a store device for the catalyst;

27. is a store for fossil fuel;
28. is a store for coal dust;
29. is a burner;
30. is a blower;
31. is a metering device for the supply of coal dust;
32. is a metering device for the supply of limestone or dolomite;
33. is a metering device for the supply of catalyst;
34. is the gypsum removed in filter 23;
35. is the carbonate removed in filter 23;
36. is the calcium oxide and calcium magnesium oxide;
37. is a metering device for calcium hydroxide or calcium magnesium hydroxide; and
38. is a zone below de-acidification temperature.

The invention will now be illustrated by the following Examples.

EXAMPLE 1

In a fluidized bed combustion plant constructed in accordance with FIG. 1, 15 tonne of coal were burned per hour. The coal contained 3% of sulfur (0.45 t S/h).

To react with this quantity of sulfur according to the overall equation $S+1.5O_2+CaO=CaSO_4$, 787.5 kg of CaO or 1227.5 kg of $CaCO_3$ are required per hour, i.e. 8.18% of the coal quantity used. CaO is calcium oxide, $CaCO_3$ is calcium carbonate and $CaSO_4$ is anhydrite (gypsum).

The calculated quantity of limestone was added to the fluidized bed furnace 1 together with the coal. This has the advantage that distribution of the limestone is effected at the same time as distribution of the coal thereby avoiding the presence at individual points in the fluidized bed furnace 1 of quantities of lime which are above or below the required quantity thereof, both of which would result in multiple consumption thereof.

The limestone was broken down to the same grain size as the coal. In the combustion process, about one quater of the sulfur oxides reacted withe the lime formed from the limestone during the combustion process. However, there were still about 590 kg/h of lime which did not react with sulfur, but were de-acidified.

This quantity of lime was removed continuously by an overflow from the furnace, together with anhydrit ($CaSO_4$) and the coal ashes produced by the reaction. After the coal ashes had been sieved, the lime was dry slaked with 190 l of water.

The fine slaked lime powder thus obtained was then either added in measured amounts to the fuel or was blasted into fluidized bed 2 or into the gas chamber above the fluidized bed.

The lime powder which has not fully reacted was finally separated in the dust extracting apparatus 22 and 23 downstream of the boiler 21.

The addition of catalyst took place either with the fuel or the lime, or by the device 6.

Since the effectiveness of the catalyst varies subject to its composition and nature, the correct amount must be determined by practical tests.

EXAMPLE 2

Figure 2:
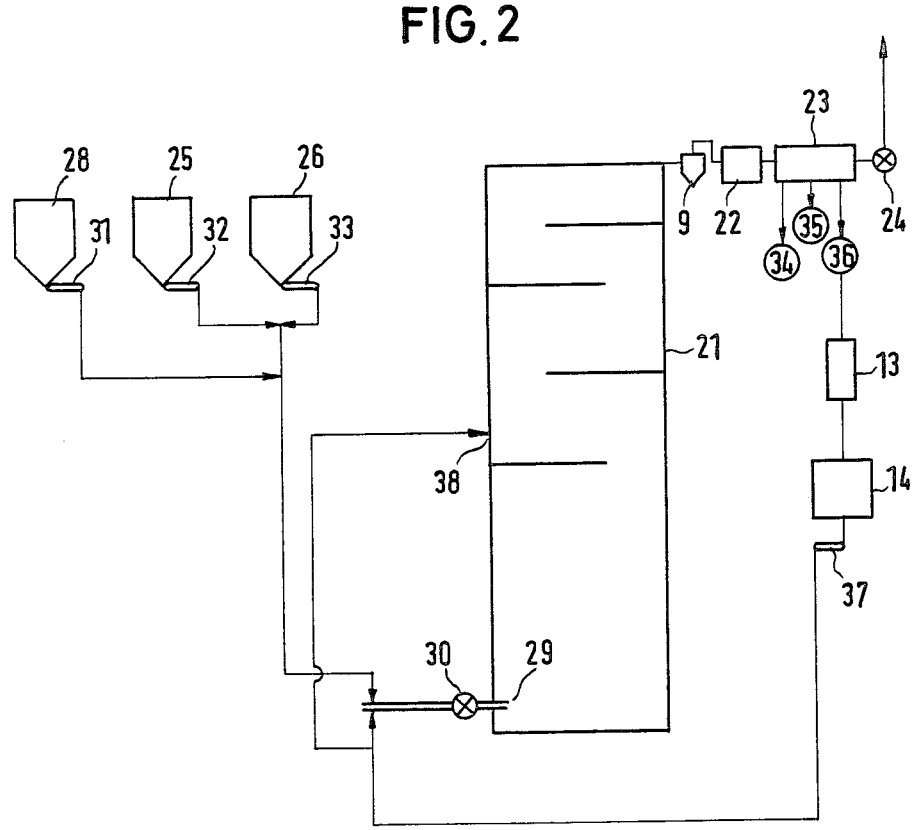
FIG. 2 is a diagrammatic representation of an apparatus for coal dust firing.

In a coal dust firing plant as represented in FIG. 2, 100t of coal dust were burned per hour. The coal dust contained 1.3% of sulfur. The proportion of sulfur was therefore 1.3 t S/h. To react with the sulfur, therefore, 2.28 t/h of CaO or 4.06 t/h of $CaCO_3$ were required.

The limestone was either finely ground separately or, more expediently, it was added to the coal before the grinding process and was ground with it.

During the combustion of the coal dust, a particularly homgeneous distribution of lime in the combustion gases is thereby ensured. During combustion, about a third of the sulfur oxides formed react in the gas chamber with the lime which was formed. The reacted lime was conveyed, together with the combustion gases, through the boiler system to the dust extracting apparatus.

A large portion of the ashes formed during combustion was separated in the boilers, whilst the finest component was separated in the dust extracting apparatus connected downstream of the boiler.

When the ash particles and the lime particles differed substantially in their grain size, separation of the ash particles from the lime particles was effected upstream of the electric filter 23 by a sifter 9. Where this was impossible, separation was effected as described earlier, by the use of electrostatic fields of varying strength in electric filter 23. The lime was then dry slaked with about 490 l/h of water.

The slaked lime thus produced was added to the coal to be injected into the furnace or was injected into the gas chamber at point 38 in boiler 21 where the temperature is so low that the $Ca(OH)_2$ was not converted into CaO.

I claim:

1. Method of reducing the sulfur oxide content of combustion gas resulting from the combustion of a sulfur-containing fossil fuel, comprising the steps of: (a) effecting combustion of said fossil fuel in a combustion zone in the presence of a carbonate selected from the group consisting of calcium carbonate and calcium magnesium carbonate whereby an oxide selected from the group consisting of calcium oxide and calcium magnesium oxide is produced from said carbonate and whereby sulfur oxides produced by said combustion react with a portion of said oxide to form a sulfate selected from the group consisting of calcium sulfate and calcium magnesium sulfate, the remaining portion of said oxide being unreacted; (b) removing said sulfate and said unreacted oxide from said combustion zone; (c) removing said unreacted oxide from said sulfate; (d) slaking with water said removed oxide to form a hydroxide selected from the group consisting of calcium hydroxide and calcium magnesium hydroxide; and (e) introducing said hydroxide to said combustion zone or to said combustion gas emanating from said combustion zone.

2. Method according to claim 1, wherein said hydroxide is recycled to said combustion zone in admixture with said fossil fuel.

3. Method according to claim 1, wherein a catalyst capable of catalyzing the equilibrium $SO_2+\frac{1}{2}O_2 \rightleftharpoons SO_3$ is conveyed to said combustion zone with said fossil fuel.

4. Method according to claim 3, wherein said catalyst is contained as an artificial or natural additive in a carrier material.

5. Method according to claim 3, wherein said catalyst is an oxide of a metal having more than one valency state.

6. Method according to claim 5, wherein said catalyst is vanadium pentoxide.

7. Method according to claim 4, wherein said catalyst is contained in oil shale or oil shale combustion waste.

8. Method according to claim 1, wherein said combustion is effected in a fluidized bed formed by particles of said carbonate.

9. Method according to claim 8, wherein said fluidized bed contains inert eddy bodies.

10. Method according to claim 8, wherein, during said combustion, the ashes resulting from said combustion, together with said oxide, are removed from said fluidized bed, and wherein said oxide and said ashes are separated from each other.

11. Method according to claim 10, wherein said separated oxide is cooled and slaked with a stoichiometric quantity of water.

12. Method according to claim 11, wherein said separated oxide, before being slaked, is separated from calcium sulfate or calcium magnesium sulfate which is adhering thereto as a result of said reaction with said sulfur oxides.

13. Method according to claim 8, wherein said hydroxide is blasted into said fluidized bed or into a gas chamber above said fluidized bed.

14. Method according to claim 1, wherein said combustion is effected in a free-burning flame, and wherein said carbonate is first finely ground before being conveyed to said combustion zone.

15. Method according to claim 14, wherein said finely ground carbonate is deacidified during said combustion, and wherein part of said sulfur oxides reacts therewith to form calcium sulfate or calcium magnesium sulfate.

16. Method according to claim 15, wherein said oxide resulting from said combustion is separated downstream of said combustion zone by a cyclone or by an electric filter.

17. Method according to claim 14, wherein said oxide is separated by sifting from the ash formed during said combustion.

18. Method according to claim 1, wherein, in order to separate the ash formed during said combustion from said oxide and from said sulfate, there is used an electrical filter with several sections through which the substances to be separated are passed successively and in which electrostatic fields of varying strength are established such that in the first section the lowest electrostatic field is established and in the last section the highest electrostatic field is established.

19. Method according to claim 18, wherein said oxide separated from the ash formed during said combustion is slaked with a stoichiometric amount of water to form said hydroxide in finely granulated form.

20. Method according to claim 19, wherein said slaked oxide, to avoid over-burning thereof, is conveyed to a zone which has a temperature below the deacidifying temperature of said carbonate.

* * * * *